United States Patent [19]
Carnes et al.

[11] 3,776,311
[45] Dec. 4, 1973

[54] METHOD OF CONTROLLING LOOSE SANDS AND THE LIKE

[75] Inventors: James D. Carnes; Bill M. Young; Kenneth D. Totty, all of Duncan, Okla.

[73] Assignee: Halliburton Company, Duncan, Okla.

[22] Filed: Sept. 25, 1972

[21] Appl. No.: 292,050

[52] U.S. Cl..................... 166/295, 166/276, 61/36 R
[51] Int. Cl......................... E02d 3/14, E21b 33/138
[58] Field of Search............................. 61/35, 36 R; 166/295, 276

[56] References Cited
UNITED STATES PATENTS

| | | | |
|---|---|---|---|
| 2,986,538 | 5/1961 | Nesbitt et al. | 166/276 X |
| 3,199,590 | 8/1965 | Young | 166/295 |
| 3,285,339 | 11/1966 | Walther et al. | 166/295 |
| 3,291,213 | 12/1966 | Bezemer et al. | 166/295 |
| 3,291,214 | 12/1966 | Hower | 166/295 |
| 3,294,166 | 12/1966 | Havenaar et al. | 166/295 |
| 3,297,089 | 1/1967 | Spain | 166/295 |
| 3,621,915 | 11/1971 | Bruist et al. | 166/276 |
| 3,646,999 | 3/1972 | Hamby, Jr. et al. | 61/36 R |
| 3,692,116 | 9/1972 | Sparlin | 166/295 |

*Primary Examiner*—Stephen J. Novosad
*Attorney*—John H. Tregoning et al.

[57] ABSTRACT

The present invention relates to an improved method of controlling loose or incompetent sands and the like in a subterranean formation wherein a hydrocarbon liquid, having a consolidating fluid dissolved and dispersed therein to control the viscosity and spread of the consolidating fluid, is introduced into the formation and the consolidating fluid is caused to harden thereby consolidating loose sands into a permeable mass.

52 Claims, No Drawings

METHOD OF CONTROLLING LOOSE SANDS AND THE LIKE

This invention relates to an improved method of consolidating loose sands or sands which will subsequently become incompetent in a subterranean formation and more particularly, to controlling such sands by forming a hard permeable mass in and/or adjacent to the formation.

A variety of sand control methods and techniques have been developed and employed heretofore to prevent the migration of loose sands and the like with the movement of fluids in subterranean formations. A particularly successful method of achieving control of such sands involves placing a consolidating fluid into the formation and thereafter causing the consolidating fluid to harden into a permeable mass so that fluids can be produced from the formation or injected therein, but loose sands and the like are prevented from migrating with the movement of the fluids. By the present invention an improved method of the type described above for controlling loose sands is provided wherein more effective utilization and spreading of the consolidating fluid is achieved and damage to formations of relatively low permeability is minimized.

The method of the present invention basically comprises combining a consolidating fluid with a hydrocarbon liquid in a manner such that a portion of the consolidating fluid is dissolved in the hydrocarbon liquid and a portion of the consolidating fluid is dispersed as an immiscible phase therein. The quantitative distribution of the consolidating fluid between the dissolved and dispersed phases is controlled to achieve desired consolidating fluid viscosity and other properties, and the resultant consolidating fluid-hydrocarbon liquid mixture is introduced into the formation. Thereafter, the consolidating fluid is caused to harden so that a portion of the loose sands contained in the formation and/or particulated solids deposited against the formation are consolidated into a hard permeable mass. In another aspect of the present invention, a portion of the hydrocarbon liquid becomes dissolved in the consolidating fluid and the consolidating fluid-hydrocarbon liquid solution is dispersed as an immiscible phase in the remaining hydrocarbon liquid. The particular quantity of hydrocarbon liquid dissolved in the consolidating fluid is controlled to achieve desired consolidating fluid viscosities and other properties.

The step of controlling the quantitative distribution of consolidating fluid between the dissolved phase and dispersed immiscible phase in the hydrocarbon liquid or the step of controlling the quantity of hydrocarbon liquid dissolved in the consolidating fluid is accomplished by controlling the particular quantities of consolidating fluid and hydrocarbon liquid used and the temperature of the consolidating fluid-hydrocarbon liquid mixture. In addition, the type and composition of the particular consolidating fluid used as well as the type and composition of the hydrocarbon liquid used influences the quantitative distribution of the consolidating fluid in the hydrocarbon liquid. This control of the consolidating fluid-hydrocarbon liquid mixture, among other things, allows the control of the viscosity of the consolidating fluid which in turn brings about superior formation treatment. For example, formations of relatively low permeability which have heretofore been difficult to treat due to the inability of the relatively viscous consolidating fluids used to penetrate and coat solids in the formation can be effectively treated by the method of the present invention. This is, by the present invention the viscosity of the consolidating fluid is controlled in a manner such that the consolidating fluid is introduced to the formation without compacting the formation or otherwise causing damage thereto. Formations of relatively low permeability which contain clays, particularly those containing clays of the water swellable type, are effectively treated by the method of the present invention through control of the viscosity of the dispersed immiscible portion of the consolidating fluid and/or dissolved consolidating fluid; and in a preferred form of the invention through shrinking and coating of the clays by the dissolved portion of the consolidating fluid. That is, the portion of the generally thicker consolidating fluid dissolved in the relatively thin hydrocarbon liquid readily enters the formation and shrinks the clays by water removal prior to or simultaneously with their coating with the immiscible consolidating fluid. A more effective utilization and spreading of a unit volume of consolidating fluid is achieved by the present invention due to the presence of dissolved consolidating fluid in the carrier liquid combined with a dispersed immiscible consolidating fluid phase therein.

A variety of consolidating fluids and/or consolidating fluid mixtures can be utilized in accordance with the method of the present invention. The consolidating fluid used must be capable of partial dissolution in the hydrocarbon liquid used, and the hydrocarbon soluble or miscible portion of the consolidating fluid must be reactable with or polymerizable with the immiscible portion of the consolidating fluid, or it must be capable of undergoing self-polymerization. Preferably, the soluble component of the consolidating fluid is self-polymerizable and, as mentioned above, possesses the property of clay treating, i.e., shrinks water swollen clays upon contact therewith, and acts as a wetting agent for loose sands and other solids to be consolidated.

Particularly suitable consolidating fluids are formed of a resin material combined with one or more monomeric materials capable of copolymerization with the resin. For example, furan resins, phenol-formaldehyde resins, urea-formaldehyde resins, and melamine resins are suitable for use in accordance with the present invention and can be combined with one or more suitable monomeric materials, dependent on resin used, such as phenols, formaldehydes, furfuryl alchol and furfural. Epoxy resins can be used by themselves or in combination with reactive diluents such as liquid monoepoxides derived from the reaction of epichlorohydrin and monohydroxyl compounds, i.e., allyl glycidyl ether, butyl glycidyl ether, and phenyl gylcidyl ether. Other reactive diluents are styrene oxide and octylene oxide and aliphatic diepoxides such as diglycidyl ether or resorcinol. The foregoing resins and diluted resins can be combined with furfuryl alcohol, phenols and furfural, and polyester resins can be used combined with styrene to form suitable consolidating fluid mixtures. In addition, two or more monomeric materials capable of copolymerization with each other, e.g., phenol and formaldehyde, and urea and formaldehyde, can be utilized, or a single monomeric material capable of self-polymerization can be used, e.g., furfuryl alcohol, furfural or styrene.

As is well understood by those skilled in the art, the particular consolidating fluid used may contain a variety of other materials which impart desired properties to the consolidating fluid such as clay treating properties, heat resistance, improved pour properties, higher flash points, lower or higher viscosity, etc. Examples of such materials are resin plasticizers, coupling agents and surfactants. Resin plasticizers such as diethyl phthalate have desirable clay treating and other properties and become a part of the final set resin. Coupling agents such as organosilicon compounds promote stronger resin-to-sand bonding, and surfactants function to lower interfacial tensions between the consolidating fluid and hydrocarbon carrier liquid as well as to break emulsions and water blocks in the formation and otherwise generally clean the formation to better accept the bonding material.

A preferred group of consolidating fluid mixtures particularly suitable for use in accordance with the present invention consists of liquid organic acid curable thermosetting resins, chemicals which undergo self-polymerization, and mixtures thereof. Examples of such organic acid curable resins are furfuryl alcohol resin, phenol-aldehyde resins, e.g., phenol-formaldehyde resin, urea-aldehyde resins, e.g., urea-formaldehyde, melamine resin, e.g., melamine formaldehyde resin, ad acid-curable epoxy resins. Examples of chemicals which undergo self-polymerization in the presence of acid catalysts or hardening agents or with sufficient heat are furfuryl alcohol and furfural. These latter two chemicals also possess the ability to copolymerize or react with the above-described resinous materials and have clay treating as well as sand wetting properties. Thus, consolidating fluid mixtures which are particularly preferred for use in accordance with the persent invention are those containing furfuryl alcohol and/or furfural and phenol-formaldehyde resin, urea formaldehyde resin, furfuryl alcohol resin, melamine resin or epoxy resin.

Another preferred group of consolidating fluid mixtures for use in accordance with the method of the present invention includes epoxy resins which are hardenable by both acid and non-acid chemicals, polyester resins which are hardenable by free radical curing agents and phenol-formaldehyde resins which are hardenable by base or alkaline type chemicals. For example, commercially available epoxy resins can be hardened or cured by contact with amines, phenol-formaldehyde resins are available which are alkaline set and polyester resins are available which are set by a variety of chemicals as will be described further hereinbelow.

A variety of hydrocarbon liquids may be utilized in accordance with the method of the present invention. For example, diesel oils, kerosenes, petroleum oil crudes, mineral oils and aromatic oils may be utilized. Liquid aliphatic or aromatic hydrocarbons having viscosities such that they can readily be injected through a subterranean formation are particularly suitable. Liquid hydrocarbons having a viscosity at 78°F in the range of from about 1 to about 25 cps are most preferred for the formations characterized by the lower permeabilities. As in the case of the consolidating fluid, the hydrocarbon liquid utilized can include a variety of additives such as surfactants, gelling or thickening agents, coupling agents, viscosity lowering agents, friction reducing chemicals, etc.

In carrying out the method of the present invention, a particular consolidating fluid mixture and hydrocarbon liquid are used which will bring about the desired results in the particular formation to be treated. For example, if the formation to be treated is of relatively low permeability and includes water sensitive clays, a relatively low viscosity hydrocarbon carrier liquid such as kerosene and a furfuryl alcohol-resin consolidating fluid mixture are used. The dissolved furfuryl alcohol component of the consolidating fluid brings about the shrinking of the clays and conditioning of the formation as the consolidating fluid-hydrocarbon liquid mixture is injected therein. The particular consolidating fluid and hydrocarbon carrier liquids selected are combined in quantities such that at the temperature at which the resultant mixture is injected into the formation a desired portion of the consolidating fluid is dissolved in the hydrocarbon liquid and a desired portion is dispersed therein or a portion of the hydrocarbon liquid is dissolved in the consolidating fluid. As previously described, the viscosity of the consolidating fluid and treating properties of the consolidating fluid-hydrocarbon liquid mixture are controlled in this manner. Once the consolidating fluid-hydrocarbon liquid mixture has been prepared, it is injected into the formation to be consolidated in a conventional manner. As will be understood, oil or water preflush solutions containing clay treating chemicals, surfactants, etc., may be injected into the formation ahead of the consolidating fluid-hydrocarbon liquid mixture to precondition the formation. Once placed in the formation the consolidating fluid is caused to set or harden.

The hardening or curing of the consolidating fluid can be brought about in a variety of ways depending upon the particular consolidating fluid used. Generally, the curing of the consolidating fluid is accomplished by contacting the consolidating fluid with a catalyst or a hardening agent. The hardening agent may be a component part of the consolidating fluid mixture or a part of an overflush or preflush solution or gaseous carrier injected into the formation after or before the consolidating fluid has been placed therein. The hardening agent may also be a component in the hydrocarbon liquid, or a combination of the above precedures may be used.

A variety of chemicals may be used as hardening agents, dependent upon the particular consolidating fluid used. A preferred group of hardening agents for use with the consolidating fluids mentioned above is acid or acid-producing chemicals. Examples of such acid forming hardening agents are acyl halide compounds such as phthaloyl, furmaryl and benzoyl chloride and oil soluble halogenated organic acids and acid-producing chemicals such as trichloroacetic acid, hexachloroacetone, benzotrichloride, etc. These acids or acid-forming hardening agents are preferably introduced into the formation as a part of an overflush solution formed of hydrocarbon liquids such as diesel oil, kerosene, mineral oil, or aromatic hydrocarbon solvents.

Suitable chemicals which can be used for curing the commercially available epoxy resins mentioned above are amine curing agents, e.g., dimethylaminopropylamine, benzyldimethylamine, diethylaminopropylamine, diethylenetriamine, metaxylene diamine, metaphenylene diamine, diaminodiphenylmethane, piperidine, tridimethylaminomethylphenol, etc. Acid anhydrides suitable for curing agents are, for example, oxalic, phthalic, pyromellitic dianhydride, dodecynyl succinic anhydride, hexahydrophthalic anhydride, methylbicyclo-(2,2,1)-5-heptene-2-3-dicarboxylic anhydride.

A suitable hardening agent which may be used with alkaline set phenol formaldehyde resin is a sodium hydroxide solution. A number of other chemicals are reactable with such phenol formaldehyde resins, e.g., phenol, 3,5 xylenol, formaldehyde, resorcinol, etc.

Commercially available polyester resins may be used in combination with reactive chemicals such as styrene, diallylphthalate, methylmethacrylate, vinyl acetate, etc. Examples of chemicals for setting or hardening such consolidating fluids are methylethylketone peroxide, azobisisobutyronitrile tertiarybutylhydroperoxide. Styrene is self-polymerizable with appropriate curing agents.

An alternate technique which may be employed in carrying out the present invention involves the introduction of a quantity of particulated solids, e.g., sand, into the consolidating fluid-hydrocarbon liquid mixture so that the solids are coated with a portion of the consolidating fluid. The resulting hydrocarbon liquid consolidating fluid mixture is introduced into the formation so that the resins coated solids transported in the hydrocarbon liquid are deposited against the formation. The portion of the consolidating fluid dissolved in the hydrocarbon liquid is carried into the formation and is deposited on the formation solids contained therein. Upon the hardening of the consolidating fluid, the particulated solids deposited against the formation are consolidated into a hard permeable mass. In this technique, the quantitative distribution of the consolidating fluid between dissolved and dispersed immiscible phases in the hydrocarbon carrier liquid is controlled in the manner described above to achieve desired fluid properties and results.

In addition, the viscosity of the hydrocarbon liquid may be varied to transport sand concentrations of from 0.5 lb per gallon to 15–20 lbs per gallon. That is, the viscosity of the hydrocarbon liquid may be varied in the range of from about 1 cps to over 1,000 cps at 78° F in order to facilitate the suspension and carrying of the particulated solids.

Clean-out or preflush solutions can be utilized prior to carrying out the method of the present invention so that the formation to be treated is cleaned of foreign material such as drilling mud and other treating chemicals. In addition, a preflush solution can be pumped into the formation containing one or more surface active agents so that desirable surface properties are given to the sands and other solids in the formation.

The following examples are set forth to more clearly illustrate the present invention, but are not to be considered as limiting the scope of the invention.

EXAMPLE 1

A variety of consolidating fluid mixtures are prepared having the compositions given in Table I.

TABLE I.—Consolidating fluid mixtures

| Component | Composition, parts by volume | | | | |
|---|---|---|---|---|---|
| | Furfuryl alcohol resin consolidating fluid (A) | Furfuryl alcohol resin consolidating fluid (B) | Furfuryl alcohol consolidating fluid | Phenol-formaldehyde resin consolidating fluid | Epoxy resin consolidating fluid |
| Furfuryl alcohol resin[1] | 100 | 100 | | | |
| Phenol formaldehyde resin[2] | | | | 100 | |
| Epoxy resin[3] | | | | | 100 |
| Gamma-aminopropyl-triethoxysilane[4] | 1.5 | 1.0 | 1.5 | 1.5 | 1.5 |
| Furfuryl alcohol | 200 | 100 | 100 | 200 | 200 |
| Diethyl phthalate[5] | 30 | | | 30 | 30 |
| Surfactant[6] | 1.5 | | | 1.5 | 1.5 |
| Surfactant[7] | | 1.0 | | | |
| Water | 10 | | | 10 | 10 |

[1] DUREZ 21687, a furfuryl alcohol resin manufactured by the Hooker Chemical Co., Durez Division.
[2] DUREZ 7421A, a phenol formaldehyde resin manufactured by the Hooker Chemical Co., Durez Division.
[3] EPON 828, an epoxy resin manufactured by the Shell Chemical Co.
[4] A resin to sand coupling agent.
[5] A resin plasticizer which possesses desirable clay-treating properties.
[6] An oil soluble and dispersible blend of alkyl aryl sulfonates and complex nonionic compounds.
[7] A cationic surfactant blend.

A furfuryl alcohol resin consolidating fluid [composition (A) shown in Table I] is added to various hydrocarbon liquids in controlled quantities and at controlled temperatures. Before and after mixing, the volume of consolidating fluid is measured and the quantitative distribution of dissolved and dispersed phases determined. The results of these tests are shown in Table II.

TABLE II

QUANTITATIVE DISTRIBUTION OF FURFURYL ALCOHOL RESIN CONSOLIDATING FLUID[5] IN VARIOUS HYDROCARBON LIQUIDS

| Quantity of consolidating fluid mixed with hydrocarbon liquid percent by volume in mixture | Temperature of fluids, °F | Diesel oil[1] | | | Aromatic oil[2] | | | Mineral oil[3] | | |
|---|---|---|---|---|---|---|---|---|---|---|
| | | Quantity of consolidating fluid dissolved in oil, percent by volume of original consolidating fluid | Quantity of consolidating fluid dispersed in oil, percent by volume of original consolidating fluid | Quantity of oil dissolved in consolidating fluid, percent by volume of original consolidating fluid | Quantity of consolidating fluid dissolved in oil, percent by volume of original consolidating fluid | Quantity of consolidating fluid dispersed in oil, percent by volume of original consolidating fluid | Quantity of oil dissolved in consolidating fluid, percent by volume of original consolidating fluid | Quantity of consolidating fluid dissolved in oil, percent by volume of original consolidating fluid | Quantity of consolidating fluid dispersed in oil, percent by volume of original consolidating fluid | Quantity of oil dissolved in consolidating fluid, percent by volume of original consolidating fluid |
| 5 | 105 | 20.8 | 79.2 | | 40.6 | 59.4 | | | [4] 100.0 | 8.9 |
| 5 | 140 | 41.2 | 58.8 | | 60.8 | 39.2 | | | [4] 100.0 | 2.0 |
| 5 | 200 | 81.8 | 18.2 | | 80.8 | 19.2 | | | [4] 100.0 | 3.8 |
| 15 | 105 | | | | | | | 1.0 | 99.0 | |
| 15 | 140 | | | | | | | 2.0 | 98.0 | |
| 15 | 200 | | | | | | | 16.7 | 83.3 | |
| 20 | 105 | 5.9 | 94.1 | | 1.0 | 99.0 | | | | |
| 20 | 140 | 11.8 | 88.2 | | 6.9 | 93.1 | | | | |

| | | | | | | | | |
|---|---|---|---|---|---|---|---|---|
| 20 | 200 | 42.3 | 57.7 | | 32.7 | 67.3 | | |
| 30 | 105 | 1.0 | 99.0 | | 1.3 | 98.7 | 29.3 | 70.7 |
| 30 | 140 | 2.0 | 98.0 | | 3.6 | 96.4 | 5.2 | 94.8 |
| 30 | 200 | 1.7 | 98.3 | | 26.3 | 73.7 | 10.3 | 89.7 |
| 50 | 105 | | [4]100.0 | 6.9 | | | | |
| 50 | 140 | | [4]100.0 | 6.9 | | | | |
| 50 | 200 | | [4]100.0 | 7.7 | | | | |
| 70 | 105 | | | | [4]100.0 | 11.7 | | |
| 70 | 140 | | | | [4]100.0 | 12.0 | | |
| 70 | 200 | | | | [4]100.0 | 15.4 | | |
| 80 | 105 | | [4]100.00 | 5.2 | | | | |
| 80 | 140 | | [4]100.00 | 7.8 | | | | |
| 80 | 200 | | [4]100.00 | 5.2 | | | | |

[1] No. 2 standard commercial grade diesel oil.
[2] Oil mixture containing a high aromatic content (medium aromatic oil mixture manufactured by Shell Chemical Co.).
[3] Standard grade mineral oil (KAYDOL, manufactured by Sannoborn Chemical Co.).
[4] In these mixtures a portion of the oil becomes dissolved in the resulting consolidating fluid and the consolidating fluid-oil solution is dispersed as an immiscible phase in the remaining oil.
[5] See Table I under Furfuryl Alcohol Resin Consolidating Fluid, Composition (A).

From Table II it can be seen that the quantitative distribution of the furfuryl alcohol resin consolidating fluid can be effectively controlled by varying the quantitative ratios of consolidating fluid and hydrocarbon liquid used, the temperature of the mixture and the composition of the hydrocarbon. Further, it will be noted that there exists a transition point wherein the consolidating fluid dissolves a portion of the hydrocarbon liquid and the resulting consolidating fluid-hydrocarbon liquid solution is dispersed as an immiscible phase in the remaining oil. When the furfuryl alcohol resin consolidating fluid is combined with diesel oil and aromatic oil, the transition point occurs at the higher consolidating fluid to oil ratios. When the consolidating fluid is combined with mineral oil, the transition point occurs at the lower quantitative ratios of consolidating fluid to hydrocarbon liquid.

EXAMPLE 2

The solubility of furfuryl alcohol in diesel oil (No. 2 standard commercial grade) at various temperatures is illustrated in Table III below.

TABLE III

SOLUBILITY OF FURFURYL ALCOHOL IN DIESEL OIL AT VARIOUS TEMPERATURES

| Temperature, °F | Solubility of Furfuryl Alcohol % by Volume in Oil |
|---|---|
| 80 | 1.0 |
| 130 | 4.76 |
| 150 | 9.1 |
| 160 | 13.0 |
| 170 | 16.7 |
| 180 | 23.1 |
| 190 | 31.0 |
| 200 | 41.2 |
| 209 | 52.4 |

From the data presented in Table III, it can be seen that the solubility of furfuryl alcohol, a self-polymerizable monomer, in diesel oil can be effectively controlled by controlling the temperature at which the furfuryl alcohol-diesel oil mixture exists.

EXAMPLE 3

A furfuryl alcohol resin consolidating fluid [composition (B) shown in Table I] is added to diesel oil in controlled quantities at controlled temperatures. Before and after mixing, the volume of consolidating fluid is measured and the quantitative distribution of dissolved and dispersed phases determined. The results of these tests are shown in Table IV below:

TABLE IV

QUANTITATIVE DISTRIBUTION OF FURFURYL ALCOHOL RESIN CONSOLIDATING FLUID [1] IN DIESEL OIL [2]

| Test temperature, °F | Quantity of consolidating fluid mixed with diesel oil, percent by volume in mixture | Quantity of consolidating fluid dissolved in oil, percent by volume of original consolidating fluid | Quantity of consolidating fluid dispersed as an immiscible phase in oil, percent by volume of original consolidating fluid |
|---|---|---|---|
| 80 | 4.1 | 5.7 | 94.3 |
| 105 | 4.1 | 20.2 | 79.8 |
| 126 | 4.1 | 26.5 | 73.5 |
| 175 | 4.1 | 46.0 | 54.0 |
| 80 | 7.9 | 2.2 | 97.8 |
| 105 | 7.9 | 4.7 | 95.3 |
| 126 | 7.9 | 8.0 | 92.0 |
| 175 | 7.9 | 36.7 | 63.3 |
| 80 | 12.5 | 0.9 | 99.1 |
| 105 | 12.5 | 0.9 | 99.1 |
| 126 | 12.5 | 1.9 | 98.1 |
| 175 | 12.5 | 16.9 | 83.1 |

[1] See Table I under Furfuryl Alcohol Resin Consolidating Fluid, Composition (B).
[2] No. 2 standard commercial grade diesel oil.

From the data presented in Table IV, the control of the quantitative distribution of consolidating fluid in diesel oil by controlling the quantitative ratio of consolidating fluid to oil used and the temperature of the mixture is illustrated. Further, a comparison of the data given in Tables II and IV illustrates that the quantitative distribution of the consolidating fluid between dissolved and dispersed phases is also controlled by varying the consolidating fluid component ratios.

EXAMPLE 4

The phenol-formaldehyde resin consolidating fluid mixture (Table I) is combined with various hydrocarbon liquids and the quantitative distribution between dissolved and dispersed phases determined in the same manner as described in Example 1. The results of these tests are shown in Table V.

TABLE V

QUANTITATIVE DISTRIBUTION OF PHENOL-FORMALDEHYDE RESIN CONSOLIDATING FLUID[3] IN VARIOUS HYDROCARBON LIQUIDS

| | | Diesel oil[1] | | Aromatic oil[2] | |
|---|---|---|---|---|---|
| Quantity of consolidating fluid mixed with hydrocarbon liquid, percent by volume in mixture | Temperature of fluids, °F | Quantity of consolidating fluid dissolved in oil, percent by volume of original consolidating fluid | Quantity of consolidating fluid dispersed in oil, percent by volume of original consolidating fluid | Quantity of consolidating fluid dissolved in oil, percent by volume of original consolidating fluid | Quantity of consolidating fluid dispersed in oil, percent by volume of original consolidating fluid |
| 5 | 105 | 40.6 | 59.4 | 20.8 | 79.2 |
| 5 | 140 | 41.2 | 58.8 | 41.2 | 58.8 |
| 5 | 200 | 61.5 | 38.5 | 42.3 | 57.7 |
| 10 | 105 | 20.8 | 79.2 | 20.8 | 79.2 |
| 10 | 140 | 31.4 | 68.6 | 31.4 | 68.6 |
| 10 | 200 | 42.3 | 57.7 | 51.9 | 48.1 |
| 20 | 105 | 10.9 | 89.1 | 5.9 | 94.1 |
| 20 | 140 | 11.8 | 88.2 | 16.7 | 83.3 |
| 20 | 200 | 18.3 | 81.7 | 32.7 | 67.3 |
| 30 | 105 | 4.3 | 95.7 | 7.6 | 92.4 |
| 30 | 140 | 8.5 | 91.5 | 8.5 | 91.5 |
| 30 | 200 | 13.5 | 86.5 | 19.9 | 80.1 |

[1] No. 2 standard commercial grade diesel oil.
[2] Oil mixture containing a high aromatic content (medium aromatic oil mixture manufactured by Shell Chemical Co.)
[3] See Table I.

EXAMPLE 5

The epoxy resin consolidating fluid mixture (Table I) is combined with various hydrocarbon liquids and the quantitative distribution between dissolved and dispersed phases determined in the same manner as described in Example 1. The results of these tests are shown in Table VI.

TABLE VI

QUANTITATIVE DISTRIBUTION OF EPOXY RESIN CONSOLIDATING FLUID[4] IN VARIOUS HYDROCARBON LIQUIDS

| | | Diesel Oil[1] | | Aromatic Oil[2] | | |
|---|---|---|---|---|---|---|
| Quantity of consolidating fluid mixed with hydrocarbon liquid, percent by volume in oil mixture | Temperature of fluids °F | Quantity of consolidating fluid dissolved in oil, percent by volume of original consolidating fluid | Quantity of consolidating fluid dispersed in oil, percent by volume of original consolidating fluid | Quantity of consolidating fluid dissolved in oil, percent by volume of original consolidating fluid | Quantity of consolidating fluid dispersed in oil, percent by volume of original consolidating fluid | Quantity of oil dissolved in consolidating fluid percent by volume |
| 5 | 105 | 41.2 | 58.8 | 41.2 | 58.8 | |
| 5 | 140 | 60.8 | 39.2 | 60.8 | 39.2 | |
| 5 | 200 | 90.4 | 9.6 | 90.4 | 9.6 | |
| 10 | 105 | 21.6 | 78.4 | 31.4 | 68.6 | |
| 10 | 140 | 41.2 | 58.8 | 60.8 | 39.2 | |
| 10 | 200 | 80.8 | 19.2 | 90.4 | 9.6 | |
| 20 | 105 | 2.0 | 98.0 | 2.0 | 98.0 | |
| 20 | 140 | 11.8 | 88.2 | 11.8 | 88.2 | |
| 20 | 200 | 32.7 | 67.3 | 62.5 | 37.5 | |
| 30 | 105 | 2.0 | 98.0 | | [3]100.0 | 4.58 |
| 30 | 140 | 2.0 | 98.0 | | [3]100.0 | 7.84 |
| 30 | 200 | 10.3 | 89.7 | | [3]100.0 | 16.7 |

[1] No. 2 standard commercial grade diesel oil.
[2] Oil mixture containing a high aromatic content (medium aromatic oil mixture manufactured by Shell Chemical Co.).
[3] In these mixtures a portion of the oil becomes dissolved in the consolidating fluid and the consolidating fluid-oil solution is dispersed as an immiscible phase in the remaining oil.
[4] See Table I.

The operability of the method of the present invention, particularly the ability to control the quantitative distribution of various consolidating fluids between dissolved and dispersed portions in various hydrocarbon carrier liquids and/or the quantity of hydrocarbon liquid dissolved in the consolidating fluid is illustrated by Tables II through VI above.

EXAMPLE 6

Thr furfuryl alcohol resin consolidating fluid [composition (A) shown in Table I] is combined with diesel oil in various quantities at various temperatures and the viscosities of the resultant dispersed immiscible consolidating fluid portions determined. The results of these tests are shown in Table VII below:

TABLE VII

VISCOSITY OF DISPERSED IMMISCIBLE PHASE OF FURFURYL ALCOHOL RESIN CONSOLIDATING FLUID[1] IN DIESEL OIL

| Quantity of consolidating fluid mixed with hydrocarbon liquid, percent by volume in mixture | Temperature of fluids, °F | Viscosity of dispersed phase of consolidating fluid, cps[3] |
|---|---|---|
| 100% Consolidating fluid (No oil) | 105 | 11.2 |
| 5 | 105 | 18.3 |
| 10 | 105 | 16.9 |
| 15 | 105 | 13.5 |
| 20 | 105 | 12.8 |
| 30 | 105 | 11.5 |
| 100% Consolidating fluid (No oil) | 200 | 5.6 |
| 5 | 200 | 96.5 |
| 10 | 200 | 29.0 |
| 15 | 200 | 11.1 |
| 20 | 200 | 8.4 |
| 30 | 200 | 7.5 |
| 80 | 200 | 5.3 |

[1] See Table I under Furfuryl Alcohol Resin Consolidating Fluid, Composition (A).
[2] No. 2 standard commercial grade diesel oil.
[3] Measured at the temperature of fluids indicated in table.

EXAMPLE 7

A furfuryl alcohol consolidating fluid [composition (B) shown in Table I] is combined with diesel oil in various quantities at different temperatures, and the viscosities of the resultant dispersed immiscible consolidating fluid portions determined. The results of these tests are shown in Table VIII below:

TABLE VIII

VISCOSITIES OF DISPERSED IMMISCIBLE PHASES OF FURFURYL ALCOHOL RESIN CONSOLIDATING FLUID[1] IN DIESEL OIL[2]

| dating fluid mixed with hydrocarbon liquid, percent by volume in mixture | Temperature of fluids, °F | persed phase of consolidating fluid, cps[3] |
|---|---|---|
| 100% Consolidating fluid (No oil) | 80 | 27.3 |
| 4.1 | 80 | 51.7 |
| 7.9 | 80 | 40.5 |
| 12.5 | 80 | 28.5 |
| 100% Consolidating fluid (No oil) | 105 | 15.0 |
| 4.1 | 105 | 54.2 |
| 7.9 | 105 | 37.0 |
| 12.5 | 105 | 18.7 |
| 100% Consolidating fluid (No oil) | 126 | 12.3 |
| 4.1 | 126 | 71.8 |
| 7.9 | 126 | 30.8 |
| 12.5 | 126 | 15.4 |
| 100% Consolidating fluid (No oil) | 175 | 7.2 |
| 4.1 | 175 | 99.6 |
| 7.9 | 175 | 27.2 |
| 12.5 | 175 | 11.5 |

[1] See Table I under Furfuryl Alcohol Resin Consolidating Fluid, Composition (B).
[2] No. 2 standard commercial grade diesel oil.
[3] Measured at the temperature of fluids indicated in table.

From the foregoing it can be seen that the viscosity of the dispersed immiscible consolidating fluid can be increased and maintained at a desired level at elevated temperatures by controlling the quantitative distribution of the consolidating fluid between dissolved and dispersed phases. This is particularly important in consolidating loose sands and the like at elevated temperatures in that once the relatively viscous dispersed consolidating fluid is deposited on the loose sands, it is not readily washed off by less viscous carrier or overflush liquids.

EXAMPLE 8

The phenol-formaldehyde resin consolidating fluid (Table I) is combined with diesel oil and the viscosity of the dispersed portion determined in the same manner as described in Example 6 above. The results of these tests are given in Table IX.

TABLE IX

VISCOSITY OF DISPERSED PHASE OF PHENOL-FORMALDEHYDE RESIN CONSOLIDATING FLUID[1] IN DIESEL OIL[2]

| Quantity of consolidating fluid mixed with hydrocarbon liquid, percent by volume by mixture | Temperature of fluids °F | Viscosity of dispersed phase of consolidating fluid, cps[3] |
|---|---|---|
| 100% Consolidating fluid (No diesel oil) | 105 | 31.5 |
| 10 | 105 | 63.5 |
| 30 | 105 | 41.5 |
| 100% Consolidating fluid (No oil) | 200 | 9.5 |
| 10 | 200 | 94.3 |
| 30 | 200 | 18.0 |

[1] See Table I.
[2] No. 2 standard commercial grade diesel oil.
[3] Measured at the temperature of fluids indicated in table.

EXAMPLE 9

The epoxy resin consolidating fluid (Table I) is combined with diesel oil and the viscosity of the dispersed immiscible portion determined in the same manner as described in Example 6 above. The results of these tests are given in Table X.

TABLE X

VISCOSITY OF DISPERSED IMMISCIBLE PHASE OF EPOXY RESIN CONSOLIDATING FLUID[1] IN DIESEL OIL[2]

| Quantity of consolidating fluid mixed with hydrocarbon liquid, percent by volume in mixture | Temperature of fluids, °F | Viscosity of dispersed phase of consolidating fluid, cps[3] |
|---|---|---|
| 100% Consolidating fluid (No oil) | 105 | 10.7 |
| 10 | 105 | 11.0 |
| 30 | 105 | 10 |
| 100% Consolidating fluid (No oil) | 200 | 5.8 |
| 30 | 200 | 5.6 |

[1] See Table I.
[2] No. 2 standard commercial grade diesel oil.
[3] Measured at the temperature of fluids indiacted in table.

From Table X it can be seen that the viscosity of the dispersed immiscible phase of the epoxy resin consolidating fluid does not change appreciably with changes in the quantitative distribution thereof between dissolved and dispersed portions. However, the effective viscosity of the dissolved consolidating fluid is much lower (the disel oil has a viscosity of less than 3 cps at 105° F) than the pure consolidating fluid (10.7 cps at 105° F) thereby allowing the introduction of the consolidating fluid into and through formations of low permeability.

From Tables III through IX it may clearly be seen that the viscosity of the dispersed immiscible portion of consolidating fluid in a hydrocarbon carrier liquid can be effectively regulated by controlling the quantities of consolidating fluid and hydrocarbon liquid used and the temperature of the mixture as well as the composition of the consolidating fluid, consolidating fluid reactant ratios, and the composition of the oil. As mentioned above, this is particularly advantageous in that it is desirable that the consolidating fluid retain body or viscosity to prevent subsequently introduced overflush solutions from washing the consolidating fluid off loose sands and solids. In tight low permeability formations less viscous consolidating fluids are desirable to facilitate injection of the consolidating fluid into the formation sands without compacting clays in the formation or otherwise damaging the formation.

EXAMPLE 10

Samples of the furfuryl alcohol consolidating fluid [composition (A) shown in Table I] are combined with diesel oil in a particular quantity at a particular temperature. Prior to combining the consolidating fluid samples with the disel oil, various quantities of the monomeric material contained in the consolidating fluid (furfuryl alcohol) are combined with the diesel oil. The viscosities of the resultant dispersed immiscible consolidating fluid portions are shown in Table XI below.

TABLE XI

VISCOSITIES OF DISPERSED IMMISCIBLE PHASE OF FURFURYL ALCOHOL RESIN CONSOLIDATING FLUID[1] IN DIESEL OIL[2] CONTAINING VARYING QUANTITIES OF FURFURYL ALCOHOL

| Quantity of consolidating fluid mixed with oil | Temperature, °F | Furfuryl alcohol, percent by volume dissolved in the oil prior to adding consolidating fluid | 200° F viscosity, cps of dispersed immiscible consolidating fluid phase | Quantity of consolidating fluid lost to oil, percent of the original volume mixed with oil |
|---|---|---|---|---|
| 5 | 200 | 0 | 96.5 | 80.8 |
| 5 | 200 | 3 | 7.9 | 42.3 |
| 5 | 200 | 5 | 4.5 | 32.6 |
| 100 % consolidating fluid (no oil) | 200 | | 5.6 | |

[1] See Table 1 under Furfuryl Alcohol Consolidating Fluid, Composition (A).
[2] No. 2 standard commercial grade diesel oil.

From the foregoing it may be seen that the viscosity of the resultant dispersed immiscible phase of consolidating fluid can be varied by adding a controlled quantity of monomeric material to the hydrocarbon liquid prior to adding the consolidating fluid thereto.

EXAMPLE 11

A furfuryl alcohol resin consolidating fluid [composition (A) shown in Table I] is combined with diesel oil in various quantities. The resulting consolidating fluid-oil mixtures are each injected through a 6 inches long, fifteen-sixteenths inch I.D. glass tube packed with a blend of 90 percent 70–170 mesh sand, 5 percent finely divided silica less than 200 mesh (U.S. Standard Sieve Series) in size and 5 percent montmorillonite clay at an injection temperature of 105° F. After injection of the consolidating fluid-oil mixtures, the consolidating fluid is caused to cure by injecting an overflush solution through each tube comprised of 2 percent by volume trichloroacetic acid in diesel oil. After the above treatment, each tube is placed in a 140° F water bath and allowed to cure for 24 hours. The resulting consolidations are cooled to 80° F and compressive strength and air permeability tests made in a conventional manner. The results of these tests are given in Table XII.

which would be encountered. The consolidating fluid-oil-sand mixtures are next flowed through and the coated sand is packed against quantities of 70–170 mesh sand (U.S. Sieve Series) to simulate deposition of the coated solids against formation sand. A small volume of No. 2 diesel oil spacer is flowed through the placed consolidating fluid coated solids followed

TABLE XII

COMPARISON OF COMPRESSIVE STRENGTHS AND PERMEABILITIES OF SIMULATED CLAYEY SAND CONSOLIDATIONS USING FURFURYL ALCOHOL RESIN CONSOLIDATING FLUID[1]

| Quantity of consolidating fluid mixed with diesel oil[2], percent by volume in mixture | Treating temperature, °F | Cure temperature, °F | 80 °F Compressive strength (psi) | Air permeability, darcies |
|---|---|---|---|---|
| 100[3] | 105 | 140 | 652 | 1.53 |
| 5 | 105 | 140 | 1420 | 0.6 |
| 10 | 105 | 140 | 1601 | 1.24 |
| 20 | 105 | 140 | 2329 | 1.21 |
| 30 | 105 | 140 | 2393 | 1.61 |
| 100[3] | 145 | 200 | 369 | 2.0 |
| 20 | 145 | 200 | 1971 | |
| 100[3] | 195 | 265 | 210 | 1.1 |
| 20 | 195 | 265 | 993 | 1.3 |

[1] See Table I under Furfuryl Alcohol Consolidating Fluid, Composition (A).
[2] No. 2 standard commercial grade diesel oil.
[3] Consolidating fluid not mixed with oil.

From the above it may be seen that clayey sands can be treated by the method of the present invention.

EXAMPLE 12

A furfuryl alcohol resin consolidating fluid [composition (B) shown in Table I] is combined with diesel oil in various quantities so that the quantitative distribution of the consolidating fluid between dissolved and dispersed portions is varied. Particulated solids (40–60 mesh sand, U.S. Sieve Series) in amounts of about 1 pound per gallon of consolidating fluid-oil mixture are added to the consolidating fluid-oil mixtures so that the solids are coated with consolidating fluid. The resulting consolidating fluid-oil-solids mixtures are agitated and the temperatures thereof gradually raised for periods of time to simulate pumping the mixtures into a subterranean formation and to simulate the temperature rise which would be encountered. The consolidating fluid-oil-sand mixtures are next flowed through and the coated sand is packed against quantities of 70–170 mesh sand (U.S. Sieve Series) to simulate deposition of the coated solids against formation sand. A small volume of No. 2 diesel oil spacer is flowed through the placed consolidating fluid coated solids followed by a quantity of No. 2 diesel oil containing a surfactant and consolidating fluid hardening agent (trichloroacetic acid). The resulting consolidations are cured for 24 hours at the simulated static formation temperature after which time the compressive strengths and interface air permeabilities of the resulting consolidations are determined in a conventional manner. The results of these tests are shown in Table XIII below.

TABLE XIII

COMPARISON OF COMPRESSIVE STRENGTHS AND AIR PERMEABILITIES OF SAND CONSOLIDATIONS PREPARED USING FURFURYL ALCOHOL RESIN CONSOLIDATING FLUID[1]-OIL[2]-SAND MIXTURES

| Quantity of consolidating fluid mixed with diesel oil, percent by volume in mixture | Quantity of consolidating fluid gallons/100 pounds sand equivalent | Treating temperature °F | Cure temperature °F | Compressive strength, psi of pack sand | Interface permeability, darcies between pack and simulated formation sand |
|---|---|---|---|---|---|
| 4.1 | 1.5 | 105 | 140 | 2896 | 7.2 |
| 7.9 | 3.0 | 105 | 140 | 2310 | 7.7 |
| 12.5 | 5.0 | 105 | 140 | 1411 | 11.3 |
| 4.1 | 1.5 | 126 | 175 | 3702 | 7.8 |
| 7.9 | 3.0 | 126 | 175 | 3010 | 8.0 |
| 12.5 | 5.0 | 126 | 175 | 1665 | 11.4 |
| 4.1 | 1.5 | 175 | 230 | 5862 | 13.5 |
| 7.9 | 3.0 | 175 | 230 | 3875 | 13.2 |
| 12.5 | 5.0 | 175 | 230 | 2054 | 14 |

[1] See Table I under Furfuryl Alcohol Consolidating Fluid, Composition (B).
[2] No. 2 standard commercial grade diesel oil.

While preferred embodiments of the present invention have been described for the purposes of disclosure, it is to be understood that the description and foregoing examples are given for the purposes of illustrating and explaining the invention, and suitable variations may be made within the scope of the appended claims without departing from the invention.

What is claimed is:

1. A method of consolidating loose sands or sands which will subsequently become incompetent in a subterranean formation comprising the steps of:

combining a consolidating fluid with a hydrocarbon liquid so that a portion of the consolidating fluid is dissolved and a portion is dispersed in an immiscible phase in the hydrocarbon liquid;

controlling the quantitative distribution of the consolidating fluid between the dissolved and dispersed immiscible phases thereof;

introducing the resultant consolidating fluid-hydrocarbon liquid mixture into the formation; and causing the consolidating fluid to harden thereby consolidating the loose sands into a hard permeable mass.

2. The method of claim 1 wherein the step of controlling the quantitative distribution of the consolidating fluid between the dissolved and dispersed immiscible phases thereof comprises controlling the quantitative ratio of consolidating fluid to hydrocarbon liquid used.

3. The method of claim 2 wherein the step of controlling the quantitative distribution of the consolidating fluid between the dissolved and dispersed phases thereof is further characterized to include the step of controlling the temperature of the resulting consolidating fluid-hydrocarbon mixture.

4. The method of claim 3 wherein the consolidating fluid is a mixture of a monomeric material and a resin selected from the group consisting of furfuryl alcohol resin, phenol formaldehyde resin, urea formaldehyde resin, melamine resin and epoxy resin.

5. The method of claim 4 wherein the monomeric material is selected from the group consisting of phenols, formaldehydes, furfuryl alcohol and furfural.

6. The method of claim 3 wherein the consolidating fluid is a mixture of polyester resin and styrene.

7. The method of claim 3 wherein the consolidating fluid is a monomeric material capable of self-polymerization.

8. The method of claim 7 wherein the monomeric material is selected from the group consisting of furfuryl alcohol, furfural and styrene.

9. The method of claim 3 wherein the consolidating fluid is a mixture of monomeric materials capable of copolymerization with each other.

10. The method of claim 9 wherein the mixture of monomeric materials is selected from the group consisting of a mixture of phenol and formaldehyde and a mixture of urea and formaldehyde.

11. The method of claim 3 wherein the consolidating fluid is acid curable and is selected from the group consisting of a mixture comprised of urea-formaldehyde resin and furfuryl alcohol, a mixture comprised of phenol-formaldehyde resin and furfuryl alcohol, and a mixture comprised of furfuryl alcohol resin and furfuryl alcohol.

12. The method of claim 3 wherein the hydrocarbon liquid is selected from the group consisting of diesel oils, kerosenes, petroleum oil crudes, mineral oils and aromatic oils.

13. The method of claim 12 wherein the step of causing the consolidating fluid to harden in the formation comprises introducing a hydrocarbon overflush solution containing a hardening agent into the formation so that the consolidating fluid is contacted thereby.

14. A method of preventing the migration of loose sands and the like with the movement of fluids through a subterranean formation comprising the steps of:

combining a consolidating fluid with a hydrocarbon liquid so that a portion of the consolidating fluid is dissolved and a portion thereof is dispersed as an immiscible phase in the hydrocarbon liquid;

controlling the quantitative distribution of the consolidating fluid between the dissolved phase and the dispersed immiscible phase thereof;

introducing a quantity of particulated solids into the consolidating fluid-hydrocarbon liquid mixture so that the particulated solids are coated with consolidating fluid;

introducing the resultant consolidating fluid-solids-hydrocarbon liquid mixture into the formation; and causing the consolidating fluid to harden thereby consolidating the particulated solids and a portion of the loose sands into a hard permeable mass.

15. The method of claim 14 wherein the step of controlling the quantitative distribution of the consolidating fluid between the dissolved and dispersed immiscible phases thereof comprises controlling the quantitative ratio of consolidating fluid to hydrocarbon liquid used.

16. The method of claim 15 wherein the step of controlling the quantitative distribution of consolidating fluid between the dissolved and dispersed immiscible phases thereof is further characterized to include controlling the temperature of the consolidating fluid-hydrocarbon liquid mixture.

17. The method of claim 16 wherein the consolidating fluid is a mixture of a monomeric material and a resin selected from the group consisting of furfuryl alcohol resin, phenol formaldehyde resin, urea formaldehyde resin, melamine resin and epoxy resin.

18. The method of claim 17 wherein the monomeric material is selected from the group consisting of phenols, formaldehydes, furfuryl alcohol and furfural.

19. The method of claim 16 wherein the consolidating fluid is a mixture of polyester resin and styrene.

20. The method of claim 16 wherein the consolidating fluid is a monomeric material capable of self-polymerization.

21. The method of claim 20 wherein the monomeric material is selected from the group consisting of furfuryl alcohol, furfural and styrene.

22. The method of claim 16 wherein the consolidating fluid is a mixture of monomeric materials capable of copolymerization with each other.

23. The method of claim 22 wherein the mixture of monomeric materials is selected from the group consisting of a mixture of phenol and formaldehyde and a mixture of urea and formaldehyde.

24. The method of claim 16 wherein the consolidating fluid is acid curable and is selected from the group consisting of a mixture comprised of urea-formaldehyde resin and furfuryl alcohol, a mixture comprised of phenol-formaldehyde resin and furfuryl alcohol and a mixture comprised of furfuryl alcohol resin and furfuryl alcohol.

25. The method of claim 16 wherein the hydrocarbon liquid is selected from the group consisting of diesel oils, kerosenes, petroleum oil crudes, mineral oils and aromatic oils.

26. The method of claim 25 wherein the step of causing the consolidating fluid to harden in the formation comprises introducing a hydrocarbon overflush solution containing a hardening agent into the formation so that the consolidating fluid is contacted thereby.

27. A method of consolidating loose sands and the like in a subterranean formation comprising the steps of:

combining a consolidating fluid with a hydrocarbon liquid so that a portion of the hydrocarbon liquid is dissolved in the consolidating fluid and the resulting consolidating fluid-hydrocarbon liquid solution is dispersed as an immiscible phase in the remaining hydrocarbon liquid;

controlling the quantity of hydrocarbon liquid dissolved in the consolidating fluid;

introducing the resultant consolidating fluid-hydrocarbon liquid mixture into the formation; and causing the consolidating fluid to harden thereby consolidating the loose sands into a hard permeable mass.

28. The method of claim 27 wherein the step of controlling the quantity of hydrocarbon liquid dissolved in the consolidating fluid comprises controlling the quantitative ratio of consolidating fluid to hydrocarbon liquid used.

29. The method of claim 28 wherein the step of controlling the quantity of hydrocarbon liquid dissolved in the consolidating fluid is further characterized to include controlling the temperature of the consolidating fluid-hydrocarbon liquid dispersion.

30. The method of claim 29 wherein the consolidating fluid is a mixture of a monomeric material and a resin selected from the group consisting of furfuryl alcohol resin, phenol formaldehyde resin, urea formaldehyde resin, melamine resin and epoxy resin.

31. The method of claim 30 wherein the monomeric material is selected from the group consisting of phenols, formaldehydes, furfuryl alcohol and furfural.

32. The method of claim 29 wherein the consolidating fluid is a mixture of polyester resin and styrene.

33. The method of claim 29 wherein the consolidating fluid is a monomeric material capable of self-polymerization.

34. The method of claim 33 wherein the monomeric material is selected from the group consisting of furfuryl alcohol, furfural and styrene.

35. The method of claim 29 wherein the consolidating fluid is a mixture of monomeric materials capable of copolymerization with each other.

36. The method of claim 35 wherein the mixture of monomeric materials is selected from the group consisting of a mixture of phenol and formaldehyde and a mixture of urea and formaldehyde.

37. The method of claim 29 wherein the consolidating fluid is acid curable and is selected from the group consisting of a mixture comprised of urea-formaldehyde resin and furfuryl alcohol, a mixture comprised of phenol-formaldehyde resin and furfuryl alcohol, and a mixture comprised of a furfuryl alcohol resin and furfuryl alcohol.

38. The method of claim 29 wherein the hydrocarbon liquid is selected from the group consisting of diesel oils, kerosenes, petroleum oil crudes, mineral oils and aromatic oils.

39. The method of claim 38 wherein the step of causing the consolidating fluid to harden in the formation comprises introducing a hydrocarbon overflush solution containing a hardening agent into the formation so that the consolidating fluid is contacted thereby.

40. A method of preventing the migration of loose sands and the like with the movement of fluids through a subterranean formation comprising the steps of:

combining a consolidating fluid with a hydrocarbon liquid so that a portion of the hydrocarbon liquid is dissolved in the consolidating fluid and the resulting consolidating fluid-hydrocarbon liquid solution is dispersed in the remaining hydrocarbon liquid;

controlling the quantity of hydrocarbon liquid dissolved in he consolidating fluid;

introducing a quantity of particulated solids into the consolidating fluid-hydrocarbon liquid dispersion so that the particulated solids are coated with consolidating fluid;

introducing the resultant consolidating fluid-solids-hydrocarbon liquid mixture into the formation; and causing the consolidating fluid to harden thereby consolidating the particulated solids and a portion of the loose sands into a hard permeable mass.

41. The method of claim 40 wherein the step of controlling the quantity of hydrocarbon liquid dissolved in the consolidating fluid comprises controlling the quantitative ratio of consolidating fluid to hydrocarbon liquid used.

42. The method of claim 41 wherein the step of controlling the quantity of hydrocarbon liquid dissolved in the consolidating fluid is further characterized to include controlling the temperature of the consolidating fluid-hydrocarbon liquid dispersion.

43. The method of claim 42 wherein the consolidating fluid is a mixture of a monomeric material and a resin selected from the group consisting of furfuryl alochol resin, phenol formaldehyde resin, urea formaldehyde resin, melamine resin and epoxy resin.

44. The method of claim 43 wherein the monomeric material is selected from the group consisting of phenols, formaldehydes, furfuryl alcohol and furfural.

45. The method of claim 42 wherein the consolidating fluid is a mixture of polyester resin and styrene.

46. The method of claim 42 wherein the consolidating fluid is a monomeric material capable of self-polymerization.

47. The method of claim 46 wherein the monomeric material is selected from the group consisting of furfuryl alcohol, furfural and styrene.

48. The method of claim 42 wherein the consolidating fluid is a mixture of monomeric materials capable of copolymerization with each other.

49. The method of claim 48 wherein the mixture of monomeric materials is selected from the group consisting of a mixture of phenol and formaldehyde and a mixture of urea and formaldehyde.

50. The method of claim 42 wherein the consolidating fluid is acid curable and is selected from the group consisting of a mixture comprised of urea-formaldehyde resin and furfuryl alcohol, a mixture comprised of phenol-formaldehyde resin and furfuryl alcohol, and a mixture comprised of furfuryl alcohol resin and furfuryl alcohol.

51. The method of claim 42 wherein the hydrocarbon liquid is selected from the group consisting of diesel oils, kerosenes, petroleum oil crudes, mineral oils and aromatic oils.

52. The method of claim 51 wherein the step of causing the consolidating fluid to harden in the formation comprises introducing a hydrocarbon overflush solution containing a hardening agent into the formation so that the consolidating fluid is contacted by the hardening agent.

* * * * *

UNITED STATES PATENT OFFICE
CERTIFICATE OF CORRECTION

Patent No. 3,776,311   Dated Dec. 4, 1973

Inventor(s) James D. Carnes; Bill M. Young; Kenneth D. Totty

It is certified that error appears in the above-identified patent and that said Letters Patent are hereby corrected as shown below:

Column 2, line 3, delete "This" and insert --That--.
Column 3, line 27, delete "ad" and insert --and--.
Column 4, line 44, delete "precedures" and insert --procedures--.
Column 5, line 26, delete "resins" and insert --resin--.
Column 6, line 33, delete the double image.

Column 11, line 10, correct "Thr" to read --The--.
Column 11, Table VIII, the beginning of the first heading should read --Quantity of Consoli- --, and the beginning of the third heading should read --Viscosity of dis- --.
Column 20, line 7, "he" should read --the--.

Signed and sealed this 21st day of May 1974.

(SEAL)
Attest:

EDWARD M. FLETCHER, JR.
Attesting Officer

C. MARSHALL DANN
Commissioner of Patents